April 6, 1937.  A. F. SPITZGLASS  2,076,100
INSTRUMENT
Filed March 5, 1934   6 Sheets-Sheet 1

INVENTOR.
Albert F. Spitzglass
BY
ATTORNEY.

April 6, 1937.  A. F. SPITZGLASS  2,076,100
INSTRUMENT
Filed March 5, 1934  6 Sheets-Sheet 2
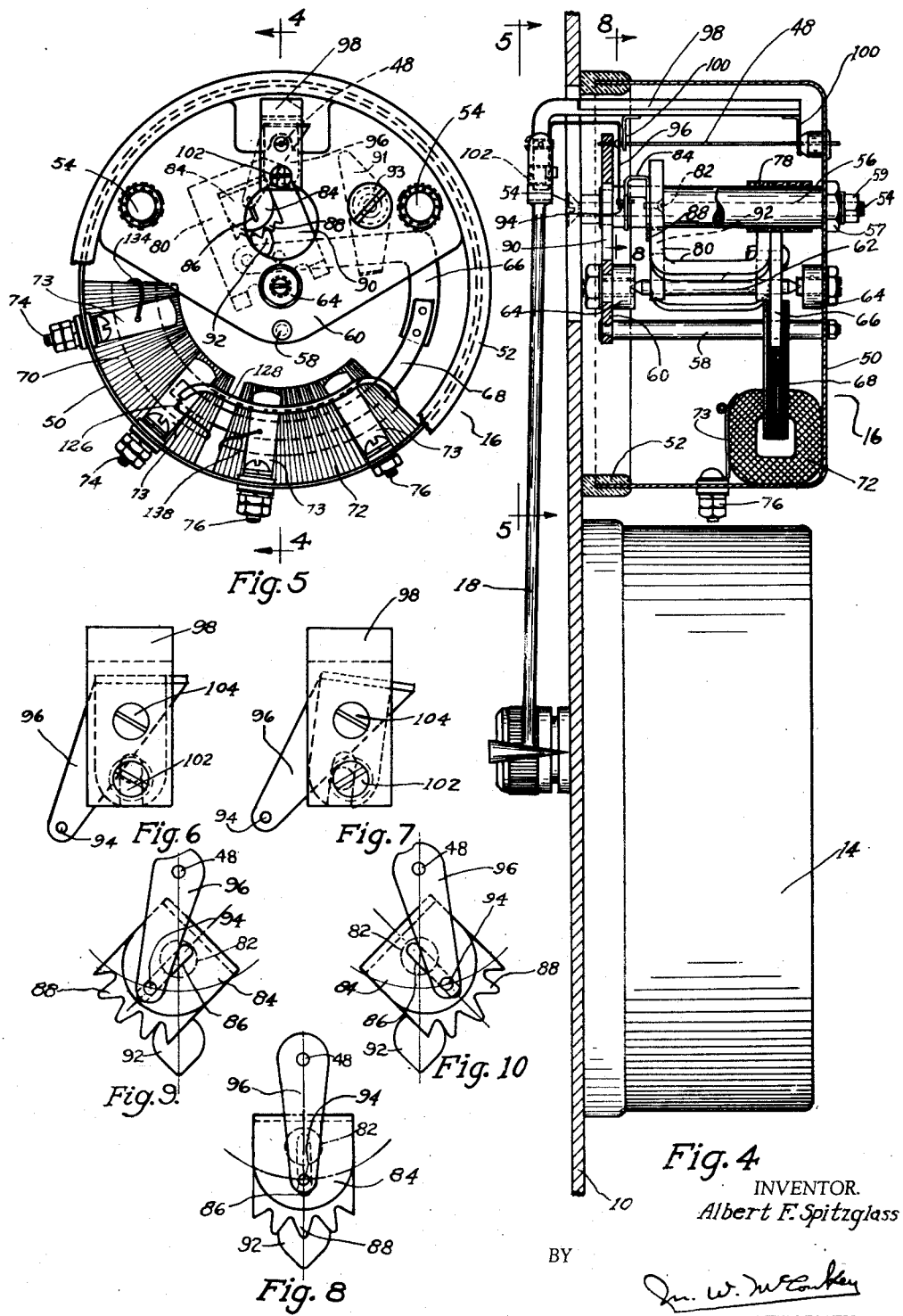
INVENTOR.
Albert F. Spitzglass
BY
ATTORNEY.

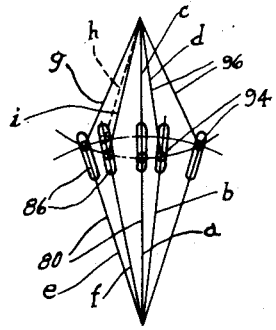
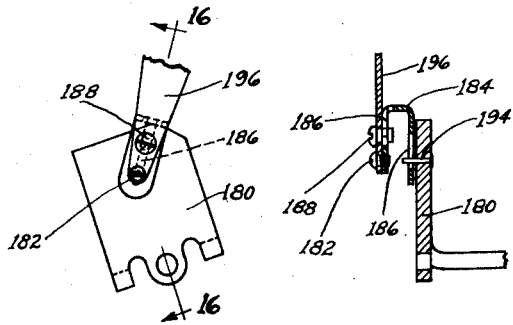
Fig. 12  Fig. 15  Fig. 16
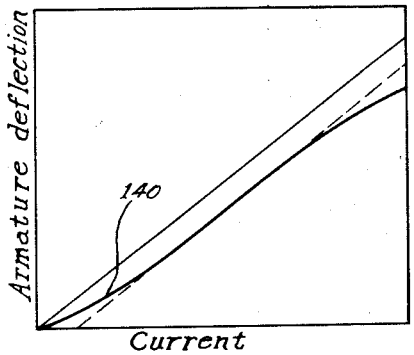
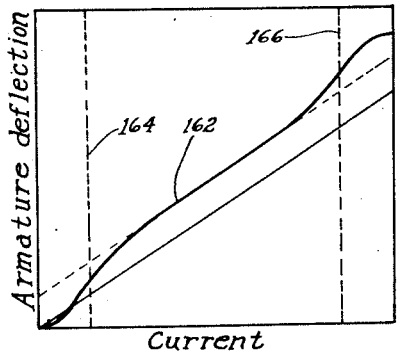
Fig. 13  Fig. 17
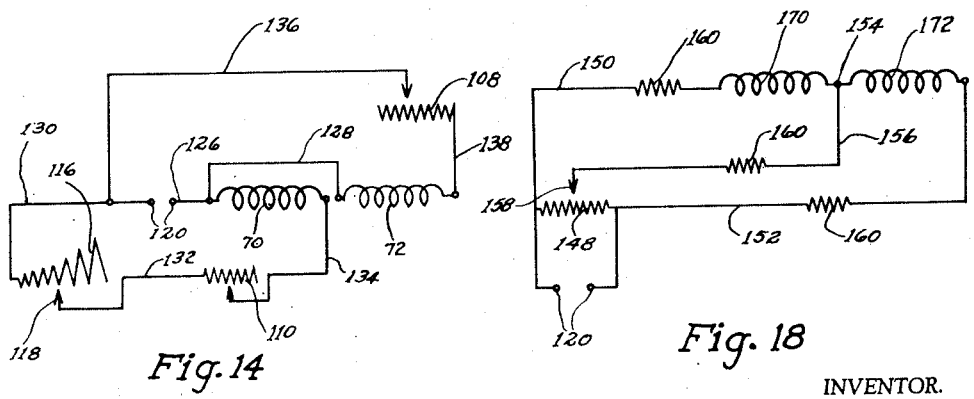
Fig. 14  Fig. 18

April 6, 1937. A. F. SPITZGLASS 2,076,100
INSTRUMENT
Filed March 5, 1934 6 Sheets-Sheet 4
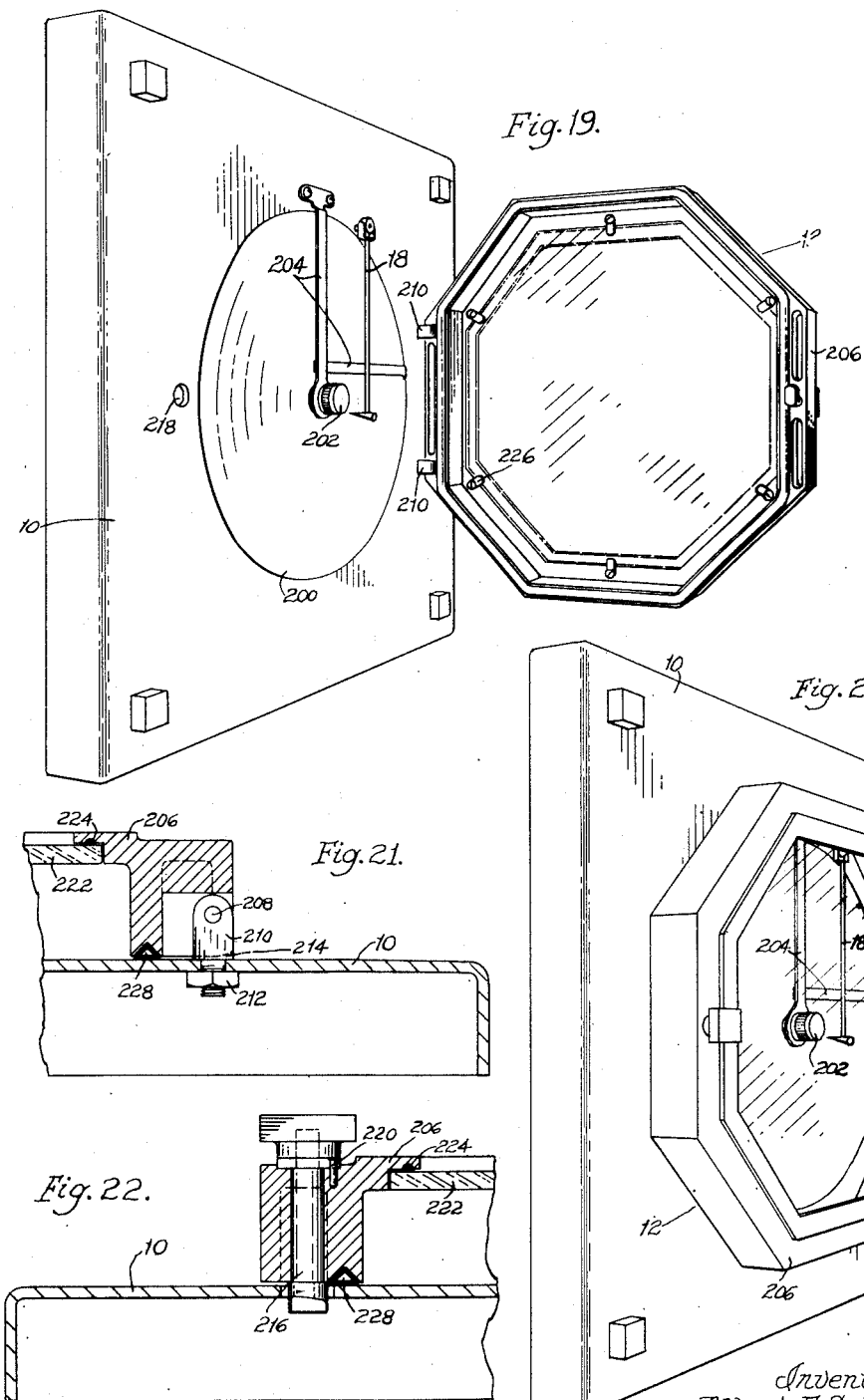

April 6, 1937.  A. F. SPITZGLASS  2,076,100
INSTRUMENT
Filed March 5, 1934  6 Sheets-Sheet 5
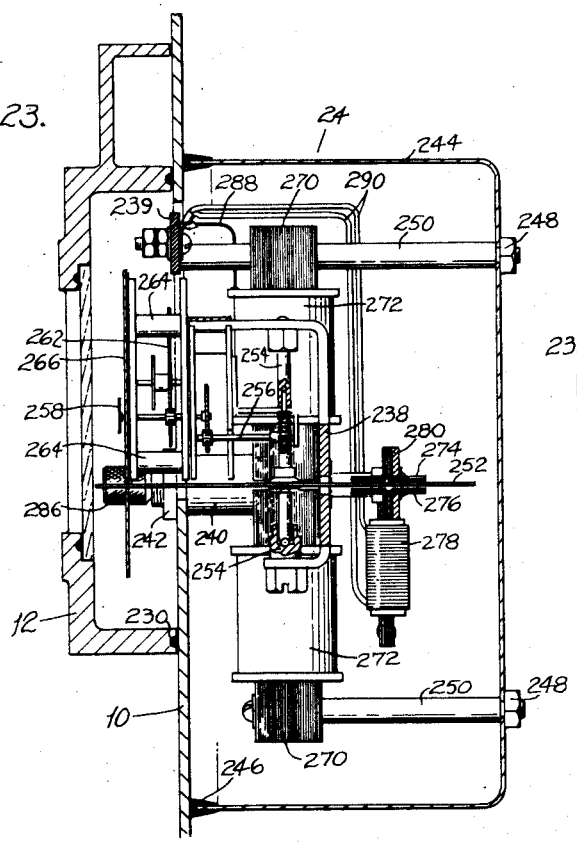
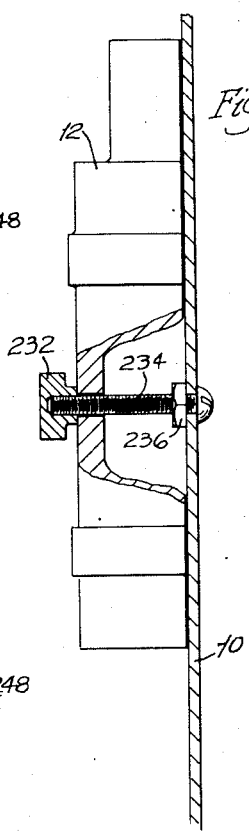
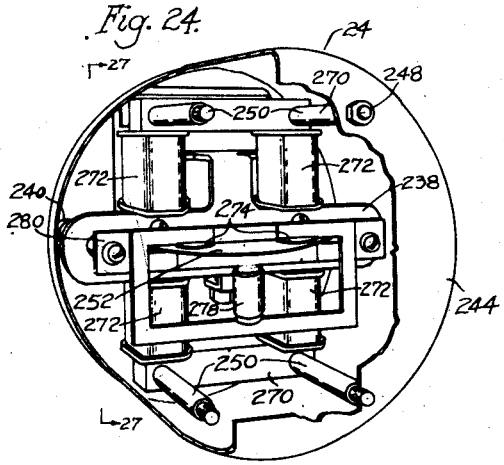
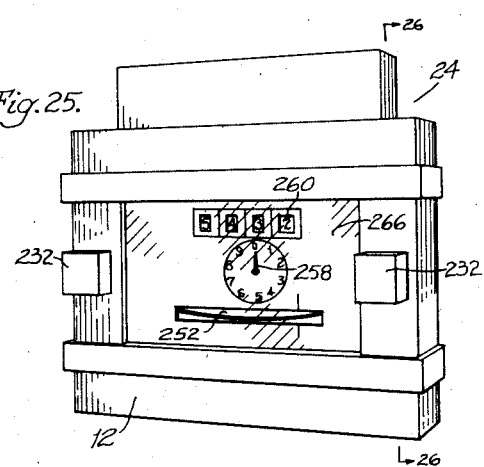
Inventor
Albert F. Spitzglass
by *M. W. McConkey*
Attorney

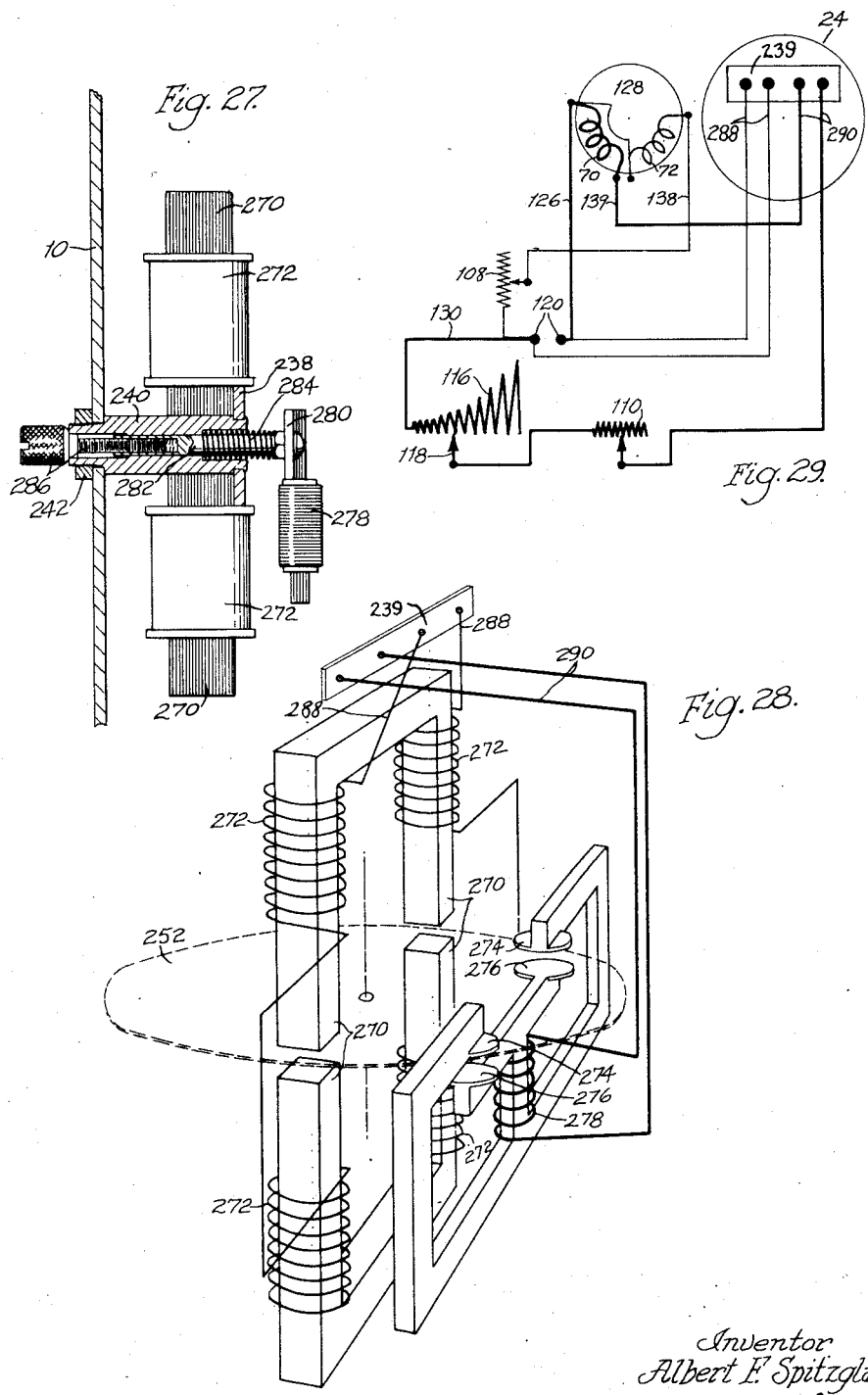

Patented Apr. 6, 1937

2,076,100

UNITED STATES PATENT OFFICE 2,076,100

INSTRUMENT

Albert F. Spitzglass, Chicago, Ill., assignor to Republic Flow Meters Company, Chicago, Ill., a corporation of Illinois Application March 5, 1934, Serial No. 714,059

18 Claims. (Cl. 171—34)

This invention relates to instruments, and is illustrated as embodied in a novel indicating and/or recording instrument adapted to be operated by remote control, as for example by a flow meter or the like.

One object of the invention is to provide a compact and reliable instrument which is capable of accurate and simple adjustment and calibration. In one form, in which the instrument is operated by an electric current under the control of a flow meter or other measuring instrument, the current energizes solenoid coils or the equivalent to operate an armature or core which rocks the operating shaft of the instrument.

This shaft rocks an operated shaft connected to the indicator and pen arms or the equivalent, and one feature of the invention relates to connecting the two shafts by a variable-movement device which causes the driven shaft to increase or decrease its movement, as it is operated by the driving shaft, as it approaches its extremes of movement, to compensate for the deviation from a straight-line function of the action of the solenoid coils, as explained below.

In one arrangement, such a connection is afforded by arms mounted on the two shafts and one of which has a pin and the other of which has a slot embracing the pin. Thus the rate of movement of the driven shaft changes as the pin shifts its position along the slot, and by proper selection and design can be made to compensate for deviations in the action of the coils for a considerable range of movement of the armature.

When this type of connection is used, I prefer to take advantage of it to compensate for inaccuracies in the manufacture of the coils, or for other variation from the desired characteristics, by mounting the part having the slot so that it may be adjusted readily angularly about an axis which at the two extreme positions of the arms intersects the above-described pin.

Thus at the two extreme positions the adjustment of the slot does not affect the reading of the instrument, so that the maximum position may be calibrated by setting suitable variable resistances and the zero position may be set by a novel zero adjustment at the pen arm or its equivalent, and to which zero adjustment another feature of the invention relates. At the same time, without disturbing the calibration for the zero and maximum positions, the midscale positions may be independently calibrated by tilting the slot, as explained below.

Another important feature of the invention relates to adapting an instrument of this character to be mounted directly on a panel, for example by clamping it in edge sealing engagement with the rear face of the panel, with the indicating or recording means operating across the front of the panel and housed under a glazed cover which seals peripherally against the front of the panel. This double use of the panel eliminates the usual extra casing for the instrument, while at the same time the instrument is readily demounted for repair without disturbing the chart mechanism or the integrating device or other associated parts, and without disturbing the adjustment and calibration of the instrument.

The above and other objects and features of the invention, including a novel large-scale auxiliary indicator and other novel combinations and desirable particular constructions, will be apparent from the following description of the illustrative embodiment shown in the accompanying drawings, in which:

Figure 4 is a partial section, on the line 4—4 of Figure 1, and with the electrical unit in section on the line 4—4 of Figure 5, vertically through the novel electrical indicating and recording unit;

Figure 5 is a front elevation of this unit, removed from the panel and with the pen arm removed, and looking in the direction of the arrows 5—5 in Figure 4;

Figures 6 and 7 are views on a larger scale of the part which carries the pen arm, from the same point of view as in Figure 5, and showing two positions of the zero adjustment;

Figure 11:
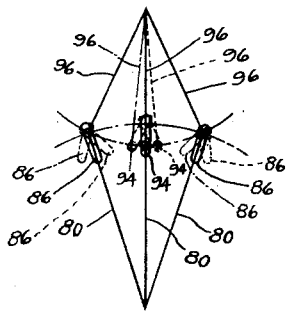

Figures 8, 9, and 10 are partial sectional views, in three positions of adjustment, on the line 8—8 of Figure 4, showing an adjustment for correcting for inaccuracies in the manufacture of the two coils;

Figure 11 is a diagram showing the operation of the adjustment of Figures 8, 9, and 10;

Figure 12 is a diagram of the driving and driven parts operating the pen arm and showing how the one operates the other;

Figure 13 is a diagram showing the curve of a flow meter or the like, and with which the operating mechanism of Figure 12 is desirable;

Figure 14 is a wiring diagram which may be used in connecting the instrument to a flow meter or the like;

Figure 15 is a view corresponding to Figure 8, but with the parts in a zero position and with the slot in the driving member and the pin in the driven member, for use in an instrument wired according to the diagram of Figure 18;

Figure 16 is a section through the driving and driven members, on the line 16—16 of Figure 15;

Figure 17 is a diagram corresponding to Figure 13 but showing the curve of an instrument wired as in Figure 18;

Figure 18 is a wiring diagram of the instrument when used with a thermometer or the like;

Figure 19 is a perspective view of a modification, showing the door open to illustrate the manner of mounting it on the panel.

Figure 20 is a similar view with the door closed;

Figure 21 is a partial section through one of the hinges of the door;

Figure 22 is a partial section through the latch of the door;

Figure 23 is a vertical section through the integrator;

Figure 24 is a perspective showing the integrator from the rear, with the casing partly broken away to show the arrangement of the mechanism;

Figure 25 is a perspective showing the integrator from the front;

Figure 26 is a vertical section showing the front casing of the integrator in side elevation, partly broken away on the line 26—26 of Figure 25 to show the means for mounting the front casing on the panel;

Figure 27 is a vertical section generally on the line 27—27 of Figure 24 showing the mounting of the integrator unit on the panel;

Figure 28 is a schematic view of the integrator mechanism, and including a wiring diagram; and Figure 29 is a wiring diagram showing the connections between the recorder circuit and the integrator circuit.

As explained and claimed in my prior application No. 680,389, filed July 14, 1933, and issuing into Patent No. 2,008,970, the instrument may be built up on a panel 10, on the back of which are mounted a number of units each having a closed housing in sealing engagement with the back of the panel and having recording or indicating means or the like extending through or visible from the front of the panel, where they are inclosed under one or more glazed covers 12 mounted in sealing engagement with the front of the panel. The entire assembly is thereby rendered dust and moisture proof without the necessity of a heavy and expensive extra casing for the assembly, and the various units may be independently removed for repair or calibration.

The illustrated units include a clock mechanism 14, or other means for driving a chart on the front of the panel, an indicating or recording unit 16 further described below and which is illustrated as operating a recording pen 18 cooperating with the chart, electrical units 20 described below and mounted on the back of the panel and which are shown connected by leads 22 to the unit 16, and also, if desired, an integrating unit 24 also controlled by leads from the electrical units 20.

I prefer to provide also, for the unit 16, an indicator in the form of a relatively long pointer arm 26 having a pointer 28 moving over a scale 30 at the top of the panel. If desired, a lamp 31, the position of which is indicated in dotted lines, may be provided to illuminate the scale. The unit 16 and the arm 26 and the opening in the panel through which the pointer 28 extends, together with the lamp 31 if one is used, are all enclosed in a housing or cover which is not shown in the drawings, but the outline of which is indicated by the dotted line 32 and which seals against the back of the panel 10.

Figure 3:
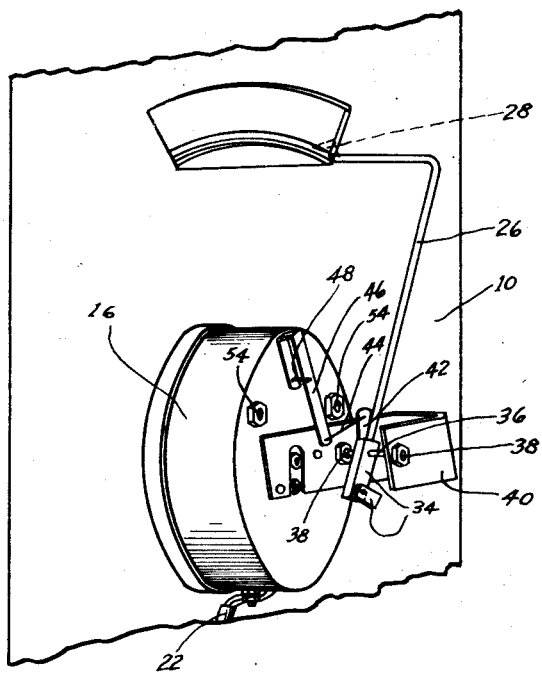
Figure 3 is a perspective, on an enlarged scale, of the upper portion of Figure 2.

The arm 26 is balanced by means such as an adjustable weight 34 (Figure 3) on a shaft 36 supported at its ends by suitable bearings 38 carried by a bracket 40 secured to the unit 16 in any desired manner. The shaft 36 has fixed thereon an arm 42 connected by a link 44 or the like to an arm 46 fixed on the end of an operating shaft 48 described below.

The unit comprises a casing 50 (Figures 4 and 5) having a rubber gasket 52 or the like which seals against the rear face of the panel 10 when the unit is secured to the panel by means such as screws or bolts 54. Sleeves 56, through which the screws 54 pass, together with a stud 58, serve to support at the front of the unit a support such as a plate 60. Nuts 57, threaded on the ends of the sleeves 56, hold the casing 50, while nuts 59 threaded on the ends of the screws 54, hold the whole instrument clamped against the rear face of the panel.

A shaft 62 is supported at its opposite ends by bearings 64 threaded through plate 60 and through the casing 50. On this shaft is clamped or otherwise secured an arm 66 carrying an arcuate armature 68 of laminated structure, formed of soft iron layers suitably secured together, the armature being an arc of a circle whose center is in the axis of the shaft 62.

The armature 68 passes through the central openings of two arcuate solenoids or coils 70 and 72 secured in the housing 50, by means such as clips 73 which may also serve as connections to the binding posts, and having respectively binding posts 74 and 76, for connection to the leads 22 to form the circuit described below. By this arrangement, the currents passing through the coils act magnetically on the armature 68 to rock the shaft 62. In its uppermost position, the arm 66 engages a rubber bumper 78 sleeved on the part 56.

The shaft 62 has mounted thereon a U-shaped member 80, the front arm of which has mounted thereon a screw 82 forming a pivot for a U-shaped stamping 84 having its outer or front leg provided with a slot 86 extending lengthwise thereof.

The entire assembly supported by shaft 62 has its weight symmetrically distributed about the shaft 62 in all directions so that no gravitational forces act upon it. The member 80 has its center of gravity in the axis of its pivot 82, so that rotation of member 84 about its axis does not disturb the balance of the supporting assembly about the axis of shaft 62.

The rear (right hand) leg has its lower edge formed with teeth 88 arranged in an arc about the axis of the pivot 82. The teeth 88 are accessible through an opening 90 in the plate 60, and project across the edge of an opening 92 formed in the part 80. By inserting a screw driver or other tool through the opening 90, and fulcruming it in the angle at the bottom of the opening 92 (see Figure 5), it will mesh with teeth 88 in the general manner of a two-toothed gear, to turn the teeth 88 to adjust the member 84 about its pivot 82, thereby turning the slot 86 to different angular positions relative to the member 80.

Three of these positions are shown in Figures 8, 9, and 10, and in the diagram of Figure 11.

As a matter of convenience in packing the instrument for shipment, a stamping 91 may be frictionally pivoted on the plate 60, and provided with an operating member 93 by which it may be turned to engage the member 80 and hold the above-described parts in one extreme position while in transit. When the instrument is set up for use, the holding device 91 is turned out of the way.

The slot 86 embraces and drives a pin 94 carried by the rear arm of a U-shaped member 96 secured to the above-mentioned shaft 48, thereby turning the shaft 48 to operate the indicator arm 26 as well as the pen arm 18. The shaft 48 is shown journaled at one end in the plate 60 and at its other end in a bearing carried by the housing 50.

A pen-arm carrier 98 is provided with bracket 100 by which it is loosely mounted on the shaft 48. The relative angular positions of the driven part 96 and the carrier 98, and therefore the zero position of the pen on its chart, are adjustably determined by an adjusting screw 102 (Figures 6 and 7) carried by the front end of the carrier 98, and formed with an eccentric portion sleeved in an opening in the front arm of the driven member 96. The screw 104 forms part of the usual means for attaching the pen arm 18 to the carrier 98, and is the pivot about which the eccentric shifts the pen arm to adjust its zero position, the screw or pivot 104 being coaxial with respect to the shaft 48.

The carrier 98 and the pen 18 form a balanced system with its center of gravity in the axis of shaft 48, about which the system rotates. Likewise, member 96 has its center of gravity in the axis of shaft 48. All the moving elements therefore are mechanically balanced about their axes of rotation and when no electrical forces act upon the armature, there is no control over their positions and they remain in any position in which they happen to be placed.

The above-described device is intended to be used to indicate and/or record (and, if desired, also to integrate) functions which have been converted into a varying electric current. The zero position is readily adjusted by means of the eccentric device 102, and the maximum or 100% position, however it may be graduated, is adjusted by means of two variable or calibrating resistances 108 and 110 which vary the current in the circuits described below. If necessary, fixed resistances 112 may be provided to reduce the current by a fixed amount. The purpose of the adjustment for the slot 86 is to compensate for inaccuracies in the coils 70 and 72 by calibrating the instrument as described below for a value midway between the zero and maximum points, in a manner proportionately changing other mid-scale readings but not affecting the zero and maximum calibrations.

The device constructed as described above is especially well adapted as a remote indicator and/or recorder for an instrument such as a flow-meter, connected up as shown in the wiring diagram of Figure 14.

In one well-known commercial flow-meter, variations in flow are caused to vary the head of a column of mercury to contact various ones of a spiral series of rods forming electric contacts. Since in these instruments the head varies as a function of the square of the flow, these contacts are not uniformly spaced, but are spaced in such a manner that successive contacts are engaged by the mercury according to equal increments of variations in the flow,—i. e., as a function of the square root of the pressure indicated by the head of the mercury column. However, this function is not a direct but a reciprocal function, so that if there were equal resistances between successive contacts the current passing through the flow meter would vary, not as a straight-line function, but according to a hyperbolic curve. Accordingly the successive resistances are not made equal, but vary according to their respective positions on such a hyperbolic curve so that the resulting current as so compensated becomes the desired straight-line function.

As such flow meters are well known in the art, no detailed description or illustration thereof is necessary herein, and the instrument is therefore indicated merely as a variable resistance 116 (with the variation thereof according to a hyperbolic curve indicated by the shape of the resistance) varied by a movable contact 118 which indicates the rising and falling mercury column of the flow meter. This system has its greatest utility where an integrated result is desired, the integration of the current being very readily accomplished in the same general manner as described in Patent No. 1,768,553, once the linear relation between current and flow is established.

Figure 1:
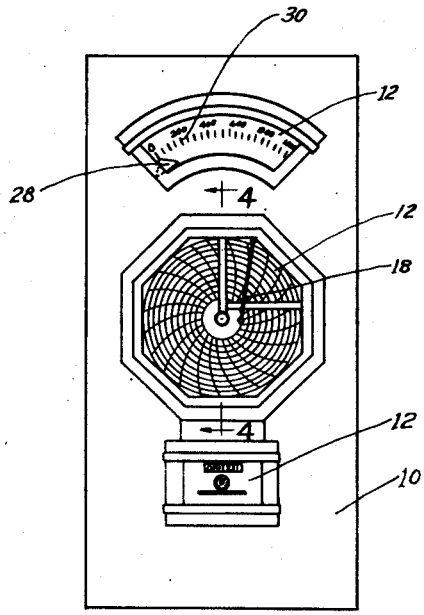
Figure 1 is a front elevation of a panel having one embodiment of my invention assembled thereon.
Figure 2:
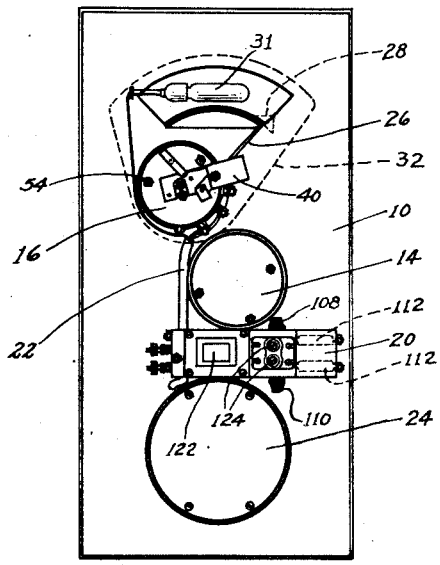
Figure 2 is a rear elevation of the panel assembly, with one of the protective housings removed and indicated by a dotted line.

The source 120 of current is shown connected at one side by a conductor 126 directly to one binding post 74 of the coil 70, and by a shunt conductor 128 to the corresponding binding post 76 of the coil 72. The source of current is shown connected at the other side by a conductor 130 to the variable flow meter resistance 116 and thence through a conductor 132 and the calibrating resistance 110 and a conductor 134 to the other binding post 74 of the coil 70. This same side of the current source 120 is also connected by a conductor 136 and the calibrating resistance 108 and a conductor 138 to the other binding post 76 of the coil 72. The conductors 126, 134, and 138 make up the connecting cable 22 shown in Figure 2. One of the binding posts 76 (the right-hand one in Figure 5) is not used for an external connection when this wiring is used.

It will be seen that there are two circuits, one passing through the flow meter and through the coil 70 (which may be called the current coil), and the other passing independently of the flow meter through the coil 72 (which may be called the potential coil). I find that the coils are in substantially correct relation when the ratio is about 400 turns of relatively heavy wire on the current coil 70 to about 800 turns of finer wire on the potential coil 72. This coil 72 acts as a retarding or damping force, and also serves to return the parts to zero (in the general manner of a return spring) when the other parts permit. Voltage fluctuations affect both coils alike, the ratio remaining constant.

When the resistance 116 is infinite, the current passing through the coil 70 is zero. The armature 68 therefore is then only acted upon by the coil 72, since all mechanical forces are balanced out, and it assumes the position shown in Figure 5, such that the laminations are symmetrically arranged with respect to the coil in a longitudinal direction. This is above referred to as the "zero" position, corresponding to zero current in coil 70, the "current" coil. As the resistance 116 decreases and the current in the coil 70 increases, the armature is drawn toward the coil 70, the deflection from the zero position depending on the ratio of the currents in the coils 70 and 72. The effect of voltage fluctuations is cancelled out, as they affect both coils alike, and this ratio (and therefore the deflection) is not affected thereby, as explained in Patent No. 1,768,552.

If the current flowing through the coil 70 be plotted as ordinates, and the corresponding deflections of the armature 68 (and therefore of arm 80) as abscissae, on a diagram such as shown in Figure 13, a curve 140 will be obtained with the above-described wiring. A considerable part of this curve approximates a straight line very closely. Since it is desired to use an integrator which, in effect, totalizes the current flowing through the resistance 116, it is desired to use the curve all the way to the zero position. However, the ends of the curve deviate somewhat from the desired straight line, and in opposite directions. It is to compensate for this deviation, and give a substantially straight-line effect on the pen arm 18 and the indicator arm 26, that I provide the drive which includes the driving slot 86 and the driven pin 94.

As illustrated in the diagram of Figure 12, when the arms 80 and 96 are in their extreme positions the pin 94 is at the upper end of the slot 86, while at mid-position the pin is near the bottom of the slot. Thus as the arms approach their extreme positions the arm 80 has to move further to move arm 96 through a given angle than is the case at mid-position.

In other words, if at mid-position the movement of arm 80 through a given angle from "a" to "b" moves arm 96 through a certain corresponding angle from "c" to "d", then movement of arm 80 through the same angle from one extreme position "e" to a position "f" will shift arm 96 from its extreme position "g" not merely through the same angle as before to a position "h", but through a greater angle to a different position "i".

This variation works in the opposite direction from the deviations of the curve 140, and by properly determining the relative lengths of the two arms the deviation in the drive can be made to compensate almost completely for the deviations in the curve.

I prefer to take advantage of the above-described slot-and-pin drive to compensate for inaccuracies in the manufacture of the coils 70 and 72, as illustrated in Figures 8, 9, 10, and 11, by shifting the part 84 containing the slot 86 angularly about its pivot 82.

At the two extreme positions of the arms 80 and 96, the pivot 82 and the pin 94 are in axial alinement, and angular adjustments of the part 84 (as appears in Figure 11) do not affect the position of the pin 94. At the mid-position of lever 80, however, when the pin 94 is in the bottom of the slot 86, turning the member 84 to tilt the slot 86 to the left (Figure 9) or to the right (Figure 10) correspondingly shifts the pin 94 to the left or the right of the position corresponding to the mid-point of the scale for the arm 18.

Thus the instrument may be calibrated for a 50% or middle position as well as for its zero and 100% or maximum position. The correction so made is a maximum at mid-scale position, and gradually diminishes to zero at both extreme positions which are independently calibrated, thereby spreading the correction uniformly over the scale.

The above-described indicating and recording instrument may also be readily modified to give a remote indication or recording for an instrument such as a thermometer or other similar instrument where it is not necessary to integrate the reading. Here the variable resistance has a linear characteristic, and may be arranged according to the wiring diagram of Figure 18.

In this modification the coils 170 and 172, corresponding to coils 70 and 72, are exactly alike, and are balanced against each other something like a Wheatstone bridge. In this case the source 120 of current is connected across the resistance 148 of the thermometer or other instrument, which resistance is also connected at its ends by conductors 150 and 152 with the opposite ends of the coils 170 and 172, the adjacent ends of the coils being connected at 154.

The point 154 is connected by a conductor 156 to the movable member 158 which is shifted along the variable resistance 148 in accordance with the temperature. For example, in one well-known type of thermometer the temperature causes expansion or contraction of a mercury column communicating with a Bourdon tube, and in this case the Bourdon tube shifts the contact 158 along the variable resistance 148. As such thermometers are well known in the art, a detailed description is not necessary herein. Suitable calibrating and controlling resistances 160 may, if needed, be inserted in the various branches of the circuit.

The curve given by this wiring, when deflections of the armature 68 are plotted against current variations, is shown at 162 in Figure 17. It is desired to use that portion of the curve between the dotted lines 164 and 166, since the flat section is not long enough to give a full-scale deflection of the instrument. Here again there are deviations at the ends of the curve from a straight line, but in the opposite directions from Figure 13.

Accordingly in this case the pin is placed on the driving element and the slot on the driven element, thereby compensating for the deviations of the curve and giving substantially a straight line.

As shown in Figures 15 and 16, in this case the pin 194 may be carried by the driving member 180, and be received in a slot 186 in a U-shaped stamping 184. The stamping 184 is shown mounted on the driven arm 196 by a pivot 182 which is alined coaxially with the pin 194 at the two extreme positions of the parts. The mid-scale position is adjusted by tilting the slot 186 by turning the stamping 184 on its pivot 182. In this case the adjustment is made by turning an adjusting screw 188 carried by the arm 196, and which has an eccentric portion received in a slot in the stamping 184.

Thus in the first arrangement the arm 96 is given an increased rate of travel as it approaches its extremes, to compensate for the deviations of the curve 140, while in the second arrangement the arm 96 is given a decreased rate of travel as it approaches its extreme positions, to compensate for the deviations of the curve 162.

Figures 19–22 illustrate the mounting of the door on the panel. As shown, the chart 200 is mounted on the driving shaft of the clock mechanism 14, where it is held by a cap nut 202. This nut also holds a spring device 204 which automatically lifts the pen arm 18 when the nut is removed.

The door or cover comprises a bezel or frame 206 mounted on pivots 208 carried by studs 210 detachably secured to the face of the panel 10 by nuts 212. The bezel is chamfered at 214 as shown in Figure 21, to permit it to swing on the pivots. The door is secured, when shut, by a latch 216, which passes through an opening 218 in the panel and is turned to engage the latch with the back of the panel. A pin 220 in a slot in latch 216 prevents turning it too far.

The door has a glass 222 sealed against a rubber gasket 224 and held by clips 226. The bezel 206 has a gasket 228 sealing against the panel.

The details of the integrator unit 24 and its mounting are shown in Figures 23 to 28. The front of the unit is shown inclosed by the glazed cover 12, provided with a sealing gasket 230 and held clamped against the face of the panel by ornamental cap nuts or the like 232, shown threaded on screws 234 carried by the panel 10. The screws 234 are shown having heads engaging the rear of the panel and carrying threaded thereon nuts 236 engaging the face of the panel, so that in effect they form threaded studs rigid with the panel.

The integrator mechanism is all arranged and mounted as a single unit, having a frame member 238 by which it may be mounted on the panel 10 over an opening therein, with certain parts projecting through the opening to the front of the panel. As shown in Figure 27, the frame 238 may have riveted thereto or otherwise rigidly secured thereon at opposite sides two posts 240 shouldered to engage the rear face of the panel and having threaded thereon nuts 242 engaging the face of the panel and rigidly mounting the integrator unit thereon.

The integrator unit is preferably housed in a sheet-metal cover 244 having an edge gasket 246 sealing against the rear of the panel 10, and held in place by means such as nuts 248 threaded on four posts 250 carried by the unit.

The integrator mechanism is shown with the usual rotating eddy current disk 252 of conducting material, having a central vertical spindle mounted in upper and lower bearings 254 carried by the integrator frame 238, and as having a driving worm or the like meshing with a corresponding driven gear on a shaft 256 which drives the usual indicating hand 258 and totalizing counter 260 through suitable gearing 262. Supports 264 carried by the unit carry a face plate 266 having suitable openings for the disk 252, the counter 260, and the shaft for the indicator or pointer 258, the face plate usually having printed thereon a dial for the pointer 258.

The disk 252 is driven by eddy currents generated by main magnets 270, shown with laminated armatures or cores, and having coils 272 arranged as close as possible to the poles of the magnets; and weaker auxiliary magnets having upper pole pieces 274 and lower pole pieces 276 carried by laminated cores or armatures and energized by a single central coil 278.

In order to provide for ready adjustment of the auxiliary magnet relatively to the main magnet, in calibrating the integrator, the auxiliary magnet with its coil 278 may be mounted on a separate support such as a bracket 280 which is adjusted at its ends to vary independently the positions of its two ends (and therefore of the poles of the auxiliary magnet) relatively to the pole pieces of the main magnet.

As one convenient means of making this calibrating adjustment, Figure 27 shows each end of the bracket 280 mounted on a plunger 282 sleeved in a bore formed in the corresponding post or support 240, and capable of being drawn more or less into the bore, against the resistance of a spring 284 sleeved on the plunger, by means such as an adjusting screw 286 threaded into a socket in the end of the plunger and having a knurled head or other operating means accessible from the face of the panel 10, i. e. from the side opposite the auxiliary magnet.

The wiring of the integrator unit is shown in Figure 28; the four coils 272 are connected in series, with two leads 288 brought out to two binding posts, and the coil 278 with two leads 290 brought out to two other binding posts. The binding posts (see Figure 23) may conveniently be mounted on the upper end 239 of the bracket 238, which is also utilized to carry the posts 250, on which the magnet armatures or cores 270 may be mounted, and which, as previously explained, also serve to hold the cover 244.

The above-described integrator may be regarded as an improvement on or adaptation of the integrator fully described in Freeman Patent No. 1,768,553, granted July 1, 1930, to which patent reference may be made for a discussion of the principles of operation. As explained in said Freeman patent, the magnets 270 are diametrically across the disk 252 from each other, and the magnets 274-276 (which are much weaker than the magnets 270) substantially parallel the magnets 270 at a short distance and are therefore in a line extending along a chord of the disk.

Figure 29 shows how the recorder and integrator circuits are inter-connected.

While one particular panel assembly has been described in detail, it is not my intention to limit the scope of the invention to that particular assembly, or otherwise than by the terms of the appended claims.

I claim:

1. A remotely-controlled instrument having a pivoted operated part, an electrical device arranged to move an operating part according to a remote-control current, and a connection between said parts so constructed and arranged that the operating part moves the operated part differently at its extremes of movement from its intermediate movement and means for adjusting said connection to vary the operating relationship between said operating and operated parts.

2. A remotely-controlled instrument having a pivoted operated part, an electrical device arranged to move a pivoted operating part according to a remote-control current, a slot-and-pin connection between said parts and means to adjust the angle of said slot to vary the operating relationship between said operating and operated parts.

3. An instrument unit comprising a casing open at its front and adapted for sealing engagement against the rear face of a panel at said open front, a support at said open front of the casing paralleling the back wall of the casing, a shaft mounted at its ends on said support and said back wall and having an operated arm swingable across and in front of the open front of the casing, another shaft paralleling the first shaft and mounted at its ends on said support and said back wall, electrical means adapted to be actuated by a remote control current to oscillate said other shaft, and a variable movement connection between said shafts.

4. An instrument unit comprising a casing open at its front and adapted for sealing engagement against the rear face of a panel at said open front, a support at said open front of the casing paralleling the back wall of the casing, a shaft mounted at its ends on said support and said back wall and having an operated arm swingable across and in front of the open front of the casing, another shaft paralleling the first shaft and mounted at its ends on said support and said back wall, electrical means adapted to be actuated by a remote control current to oscillate said other shaft, and arms on said shafts one of which has a pin and the other of which has a slot embracing the pin.

5. An instrument unit comprising a casing open at its front and adapted for sealing engagement against the rear face of a panel at said open front, a support at said open front of the casing paralleling the back wall of the casing, a shaft mounted at its ends on said support and said back wall and having an operated arm swingable across and in front of the open front of the casing, another shaft paralleling the first shaft and mounted at its ends on said support and said back wall, electrical means adapted to be actuated by a remote control current to oscillate said other shaft, and arms on said shafts one of which has a pin and the other of which has a slot embracing the pin, together with means for adjusting the inclination of said slot about an axis passing through said pin at its extreme positions.

6. An instrument unit comprising a casing having a front support paralleling the back wall of the casing, a shaft mounted at its ends on said support and said back wall and having an operated arm swingable across and in front of the casing, another shaft paralleling the first shaft and mounted at its ends on said support and said back wall, means adapted to be actuated by a remote control current to oscillate said other shaft, and a variable movement connection between said shafts.

7. An instrument unit comprising a casing open at its front and adapted for sealing engagement against the rear face of a panel at said open front, a support at said open front of the casing paralleling the back wall of the casing, a shaft mounted at its ends on said support and said back wall and having an operated arm swingable across and in front of the open front of the casing, another shaft paralleling the first shaft and mounted at its ends on said support and said back wall, solenoid coils arranged end to end in said casing and curved about the axis of said other shaft, a curved armature mounted on said other shaft and swinging as a movable core in said coils, and a variable-movement connection between the shafts.

8. An instrument unit comprising a casing having a front support paralleling the back wall of the casing, a shaft mounted at its ends on said support and said back wall and having an operated arm swingable across and in front of the casing, another shaft paralleling the first shaft and mounted at its ends on said support and said back wall, solenoid coils arranged end to end in said casing and curved about the axis of said other shaft, a curved armature mounted on said other shaft and swinging as a movable core in said coils, and a variable-movement connection between the shafts.

9. An instrument unit comprising a casing having a front support paralleling the back wall of the casing, a shaft mounted at its ends on said support and said back wall and having an operated arm swingable across and in front of the casing, another shaft paralleling the first shaft and mounted at its ends on said support and said back wall, solenoid coils arranged end to end in said casing and curved about the axis of said other shaft, a curved armature mounted on said other shaft and swinging as a movable core in said coils, and a connection between the shafts.

10. An instrument having a shaft having an oscillatable arm mounted thereon, an indicator arm pivoted on the first arm, and a device mounted on one arm and having an eccentric engaging the other arm at a point spaced from the pivotal connection between the arms for adjusting the arms relatively to each other to adjust the "zero" setting of the instrument without affecting the balance of the parts carried by said shaft.

11. An instrument having spaced parallel shafts, one having an arm provided at its end with a projecting pin, the other having an arm provided at its end with a part angularly adjustable relatively to said last named arm and having a slot embracing said pin.

12. An instrument having parallel shafts, one having an arm provided at its end with a projecting pin, the other having an arm provided at its end with an angularly-adjustable part having a slot embracing said pin, said shafts being so spaced that the axis of the angular adjustment of said part intersects said pin at the extremes of movement of said arms, whereby adjustment of said part has no effect on the extreme positions to which one arm is moved by the other but does affect intermediate positions.

13. An instrument having parallel shafts, one having an arm provided at its end with a projecting pin, the other having an arm provided at its end with an angularly-adjustable part having a slot embracing said pin, said part having teeth arranged in an arc about its axis of adjustment and adapted to be engaged by an adjusting tool.

14. An instrument having an operating and an operated shaft paralleling each other and having a driving connection there-between, an operated part on the operated shaft, an adjustable connection between said part and shaft for changing the position of the part angularly of said shaft, electrical means for oscillating the operating shaft having a variable resistance for settting the angular position of said operated part at maximum current, and means for adjusting said driving connection for changing the midscale positions of said part for given angular positions of the operating shaft without changing the zero and maximum positions of said part.

15. An instrument having an operating and an operated shaft paralleling each other and having a variable-movement driving connection there-between including a pin and a slot embracing the pin, an operated part on the operated shaft, an adjustable connection between said part and shaft for changing the position of the part angularly of said shaft, electrical means for oscillating the operating shaft having a variable resistance for setting the angular position of said operated part at maximum current, and means for changing the inclination of the slot in said connection to change the midscale positions of said part for given angular positions of the operating shaft without changing the zero and maximum positions of said part.

16. A panel having an instrument mounted in sealing engagement with its rear face and having recording means extending through and operating on the front face of said panel, said instrument having a shaft projecting there-through on the opposite side from the panel, a glazed cover over said means in sealing engagement with the front face of the panel, an indicator arm operatively connected to said shaft having an indicator visible from the front of the panel, and covers engaging the front and rear faces of the panel and housing said indicator arm and said instrument.

17. An instrument unit comprising a pair of spaced rigidly connected supporting members, a shaft mounted at its ends on said supporting members respectively and having an operating arm swingable across and in front of one of the supporting members, another shaft paralleling the first shaft and mounted at its ends on said supporting members respectively, electrical means adapted to be actuated by a remote control current to oscillate said other shaft, and a variable movement connection between said shafts.

18. An instrument unit comprising a pair of spaced rigidly connected supporting members, a shaft mounted at its ends on said supporting members respectively and having an operating arm swingable across and in front of one of the supporting members, another shaft paralleling the first shaft and mounted at its ends on said supporting members respectively, solenoid coils arranged end to end and mounted closely adjacent and parallel to one of said supports, and curved about the axis of said other shaft, a curved armature mounted on said other shaft and swingable as a movable core in said coils, and a connection between the shafts.

ALBERT F. SPITZGLASS.